Dec. 25, 1923.

W. MYCOCK 1,478,905

BEARING FOR THE CYLINDERS OF DRYING MACHINES.

Filed Feb. 6, 1923  2 Sheets-Sheet 1

INVENTOR
William Mycock

Dec. 25, 1923.

W. MYCOCK

BEARING FOR THE CYLINDERS OF DRYING MACHINES

Filed Feb. 6, 1923  2 Sheets-Sheet 2

1,478,905

INVENTOR
William Mycock

Patented Dec. 25, 1923.

1,478,905

UNITED STATES PATENT OFFICE.

WILLIAM MYCOCK, OF ROCHDALE, ENGLAND.

BEARING FOR THE CYLINDERS OF DRYING MACHINES.

Application filed February 6, 1923. Serial No. 617,313.

*To all whom it may concern:*

Be it known that I, WILLIAM MYCOCK, a British subject, residing at Rochdale, county of Lancaster, England, have invented certain new and useful Improvements in Bearings for the Cylinders of Drying Machines (for which I have filed an application in Great Britain dated February 1, 1922), of which the following is a specification This invention relates to the bearings or "doll heads" of the cylinders of drying machines in which an interior non-rotary sleeve of spherical contour is fitted to receive and form a bearing for the trunnion of the cylinder held in position within the doll head by a cage and screw.

The invention is designed to provide an improved packing between the sleeve bearing and the cylinder trunnion to prevent leakage of steam between the two.

According to the invention the rear end of the spherical sleeve bearing is extended at the rear end and the free end of the trunnion is also extended providing a recess within the sleeve to receive packing, and a shoulder against which the packing is compressed by a hollow nut or ferrule screwed on to or into the rear end of the spherical sleeve thereby forming a packing gland and steam tight joint between the trunnion and the spherical sleeve bearing.

The invention will be fully described with reference to the accompanying drawings.

The doll head housing A and the non-rotary spherical sleeve bearing B are of known construction to receive the trunnion C of the drying cylinder.

The rear end of the spherical sleeve B is extended beyond the bearing surface of the trunnion C and the trunnion C is formed with a shoulder D and is reduced in diameter at d to form a recess or gland to receive packing E.

Figure 1:
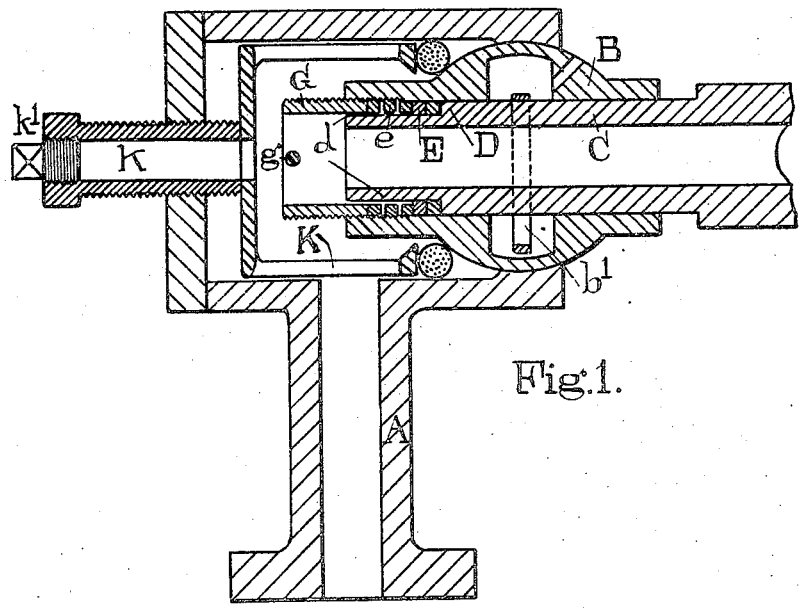
Fig. 1 is a longitudinal section showing the preferred form of the invention showing the gland nut G screwed into the interior of the spherical sleeve bearing.
Figure 2:
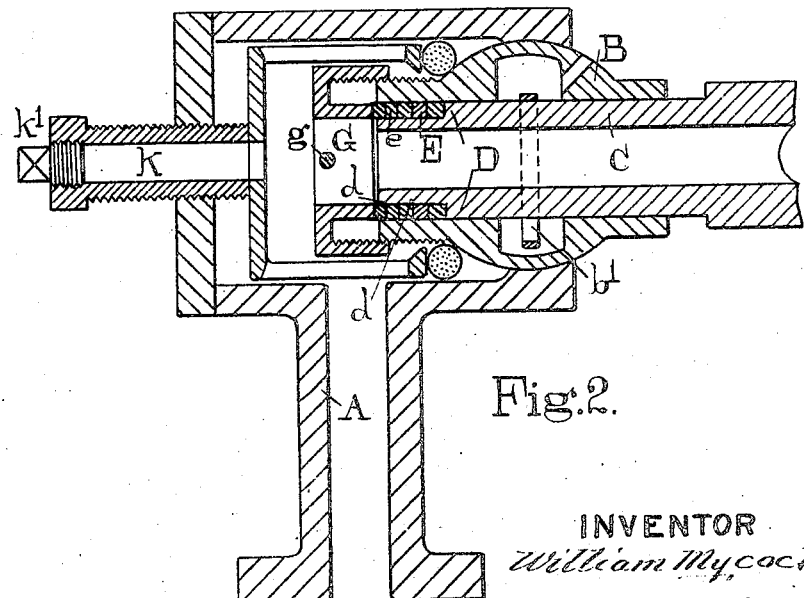
Fig. 2 is a longitudinal section showing the gland nut G screwed on to the exterior of the spherical sleeve bearing.
Figure 3:
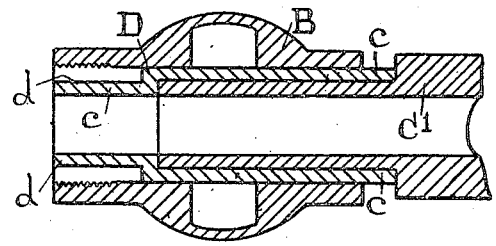
Fig. 3 is a longitudinal section of trunnion C showing a method of extending it to form the shoulder D by shrinking a sleeve c on to it.
Figure 4:
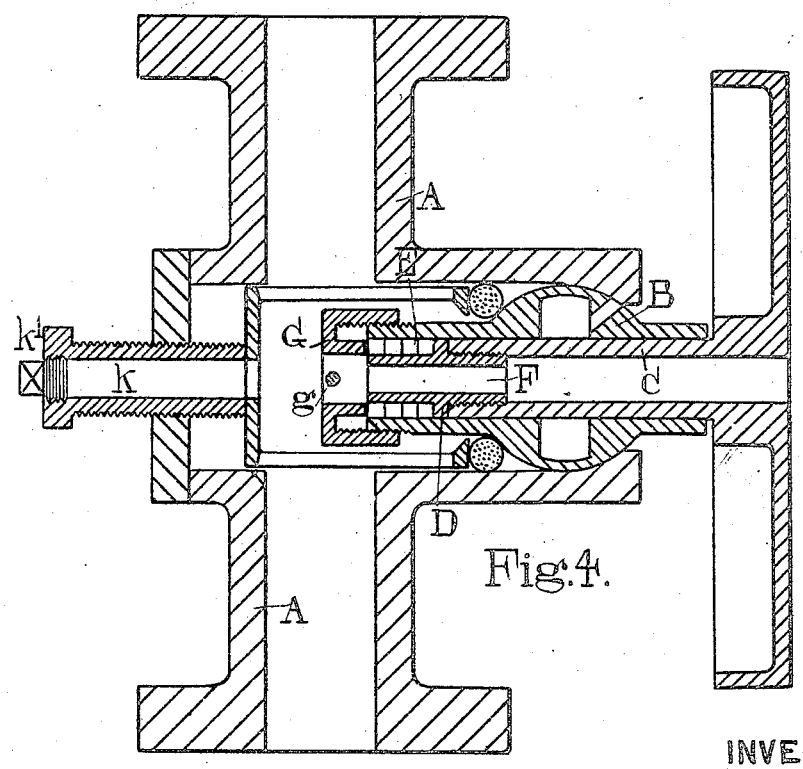
Fig. 4 is a longitudinal section showing method of extending it by screwing a nipple F into the interior.

The trunnion C may be made sufficiently long and of such a diameter as to permit of its being turned down to a reduced diameter at d with a shoulder D as in Figs. 1 and 2. Or as in the case of existing cylinders a sleeve c may be shrunk on to the old trunnion C' as in Fig. 3 or a nipple or ferrule F formed with a shoulder D may be screwed into the end of the trunnion C to form the recess or gland for packing as in Fig. 4.

The packing E may be of ordinary material with a metal spring e behind it, and a hollow nut G is screwed into or on to the spherical sleeve B to compress the packing. When screwed on to the sleeve the hollow nut G is of channel shape in cross section (as in Figs. 2 and 4) the inner member of the nut compressing the packing against the shoulder D of the trunnion.

The nut G may be turned to tighten the packing by a bifurcated tool inserted through the hollow screw k engaging a cross pin g fitted into the nut.

The spherical sleeve bearing B at its front end abuts against a spherical seating and is packed in the housing A with a packing ring b held in position by a cage K and a screw k in known manner, the screw k being hollow to permit of a tool being inserted to operate the nut G and closed with a plug k'.

The spherical bearing B may be made with an oil recess and oil ring b' to lubricate the trunnion C.

What I claim as my invention and desire to protect by Letters Patent is:—

In a bearing or doll head for the cylinders of drying machines with a spherical sleeve bearing the combination with a shoulder at the rear end of the cylinder trunnion of a recess and gland for packing between the trunnion and the interior of the spherical sleeve and a nut screwed to the end of the spherical sleeve to compress the packing substantially as described.

In testimony whereof I have hereunto set my hand in presence of two subscribing witnesses.

WILLIAM MYCOCK.

Witnesses:
 I. OWDEN O'BRIEN,
 GEORGE H. O'BRIEN.